United States Patent
Park et al.

(10) Patent No.: US 8,626,096 B2
(45) Date of Patent: Jan. 7, 2014

(54) METHODS AND APPARATUS FOR COMBINING SIGNALS FROM MULTIPLE DIVERSITY SOURCES

(75) Inventors: Jong Hyeon Park, San Jose, CA (US); Bok Tae Sim, San Ramon, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1492 days.

(21) Appl. No.: 12/034,954

(22) Filed: Mar. 24, 2008

(65) Prior Publication Data
US 2009/0239494 A1 Sep. 24, 2009

(51) Int. Cl.
*H04B 17/02* (2006.01)
(52) U.S. Cl.
USPC .......................................................... 455/137
(58) Field of Classification Search
USPC ........ 455/424, 425, 465.5, 456.6, 561, 550.1, 455/575.1, 500, 63.1, 101, 334, 272, 273; 375/230, 232, 229, 347, 349, 148, 260, 375/296, 267; 370/335, 342, 343, 345, 480, 370/330, 208, 209
See application file for complete search history.

(56) References Cited

U.S. PATENT DOCUMENTS

| | | | | |
|---|---|---|---|---|
| 5,369,412 A * | 11/1994 | Tsujimoto | .................... | 342/380 |
| 5,884,192 A * | 3/1999 | Karlsson et al. | ........... | 455/562.1 |
| 6,512,738 B1 | 1/2003 | Namekata et al. | | |
| 7,573,963 B2 * | 8/2009 | Pan | ............... | 375/347 |
| 7,907,894 B2 | 3/2011 | Avellan et al. | | |
| 2002/0166097 A1 * | 11/2002 | Persson et al. | ............... | 714/822 |
| 2002/0196734 A1 | 12/2002 | Tanaka et al. | | |
| 2003/0043892 A1 * | 3/2003 | Braun | ............... | 375/148 |
| 2006/0034240 A1 | 2/2006 | Kwak et al. | | |
| 2006/0268963 A1 * | 11/2006 | Yoshida | ............... | 375/148 |
| 2007/0036066 A1 * | 2/2007 | Thomas et al. | ............... | 370/208 |
| 2007/0147557 A1 | 6/2007 | Demoulin et al. | | |
| 2007/0211619 A1 * | 9/2007 | Jalloul et al. | ............... | 370/209 |
| 2007/0230605 A1 * | 10/2007 | Osseiran et al. | ............... | 375/260 |
| 2008/0037670 A1 * | 2/2008 | Lee et al. | ............... | 375/260 |
| 2008/0096509 A1 | 4/2008 | Ling | | |
| 2009/0203324 A1 | 8/2009 | Matsumoto et al. | | |
| 2009/0225913 A1 * | 9/2009 | Nakahara et al. | ............. | 375/347 |

(Continued)

FOREIGN PATENT DOCUMENTS

| EP | 1204218 A1 | 5/2002 |
|---|---|---|
| EP | 1845646 A1 | 10/2007 |

(Continued)

OTHER PUBLICATIONS

International Search Report and Written Opinion—PCT/US2008/067455—ISA/EPO—Jun. 3, 2009.

(Continued)

*Primary Examiner* — Yuwen Pan
*Assistant Examiner* — Ankur Jain
(74) *Attorney, Agent, or Firm* — Charles Chesney

(57) ABSTRACT

A method for combining signals coming from multiple diversity sources may include performing maximal-ratio combining (MRC) based equalization and combining for receiver antenna diversity. The method may also include performing MRC-based equalization and combining for repetition diversity. The method may also include performing MRC-based equalization and combining for duplication diversity. The MRC-based equalization and combining for receiver antenna diversity, the MRC-based equalization and combining for repetition diversity, and the MRC-based equalization and combining for duplication diversity may each be performed separately.

52 Claims, 8 Drawing Sheets

(56) References Cited

U.S. PATENT DOCUMENTS

| | | | | |
|---|---|---|---|---|
| 2009/0238063 A1* | 9/2009 | Park et al. | | 370/208 |
| 2009/0262855 A1* | 10/2009 | Lee et al. | | 375/267 |
| 2009/0279528 A1* | 11/2009 | Kent et al. | | 370/342 |
| 2010/0026057 A1* | 2/2010 | Miller | | 297/21 |
| 2010/0085934 A1* | 4/2010 | Wang et al. | | 370/330 |
| 2010/0316163 A1* | 12/2010 | Forenza et al. | | 375/296 |

FOREIGN PATENT DOCUMENTS

| | | |
|---|---|---|
| JP | 11205208 A | 7/1999 |
| JP | 2002009680 A | 1/2002 |
| JP | 2002368714 A | 12/2002 |
| JP | 2003174390 A | 6/2003 |
| JP | 2003258763 A | 9/2003 |
| JP | 2004104574 | 4/2004 |
| JP | 2006050644 A | 2/2006 |
| KR | 20040007661 | 1/2004 |
| KR | 20050013451 A | 2/2005 |
| KR | 20050114735 A | 12/2005 |
| RU | 2189112 C2 | 9/2002 |
| RU | 2280929 C1 | 7/2006 |
| TW | I247493 B | 1/2006 |
| TW | I270301 B | 1/2007 |
| TW | I288545 B | 10/2007 |
| WO | WO2006082815 A1 | 8/2006 |

OTHER PUBLICATIONS

Lin Wen-Bin: "IEEE 802.16 OFDMA PHY" National Tsing Hua University, Communication Soc Lab, Jul. 19, 2006, pp. 1-64, XP002523038.

Taiwan Search Report—TW097124738—TIPO—Nov. 19, 2011.

Taiwan Search Report—TW097124738—TIPO—Aug. 27, 2012.

* cited by examiner

METHODS AND APPARATUS FOR COMBINING SIGNALS FROM MULTIPLE DIVERSITY SOURCES

TECHNICAL FIELD

The present disclosure relates generally to wireless communication systems. More specifically, the present disclosure relates to methods and apparatus for combining signals coming from multiple diversity sources.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

As indicated above, the present disclosure relates generally to wireless communication systems. More specifically, the present disclosure relates to methods and apparatus for combining signals coming from multiple diversity sources.

SUMMARY

Figure 1:
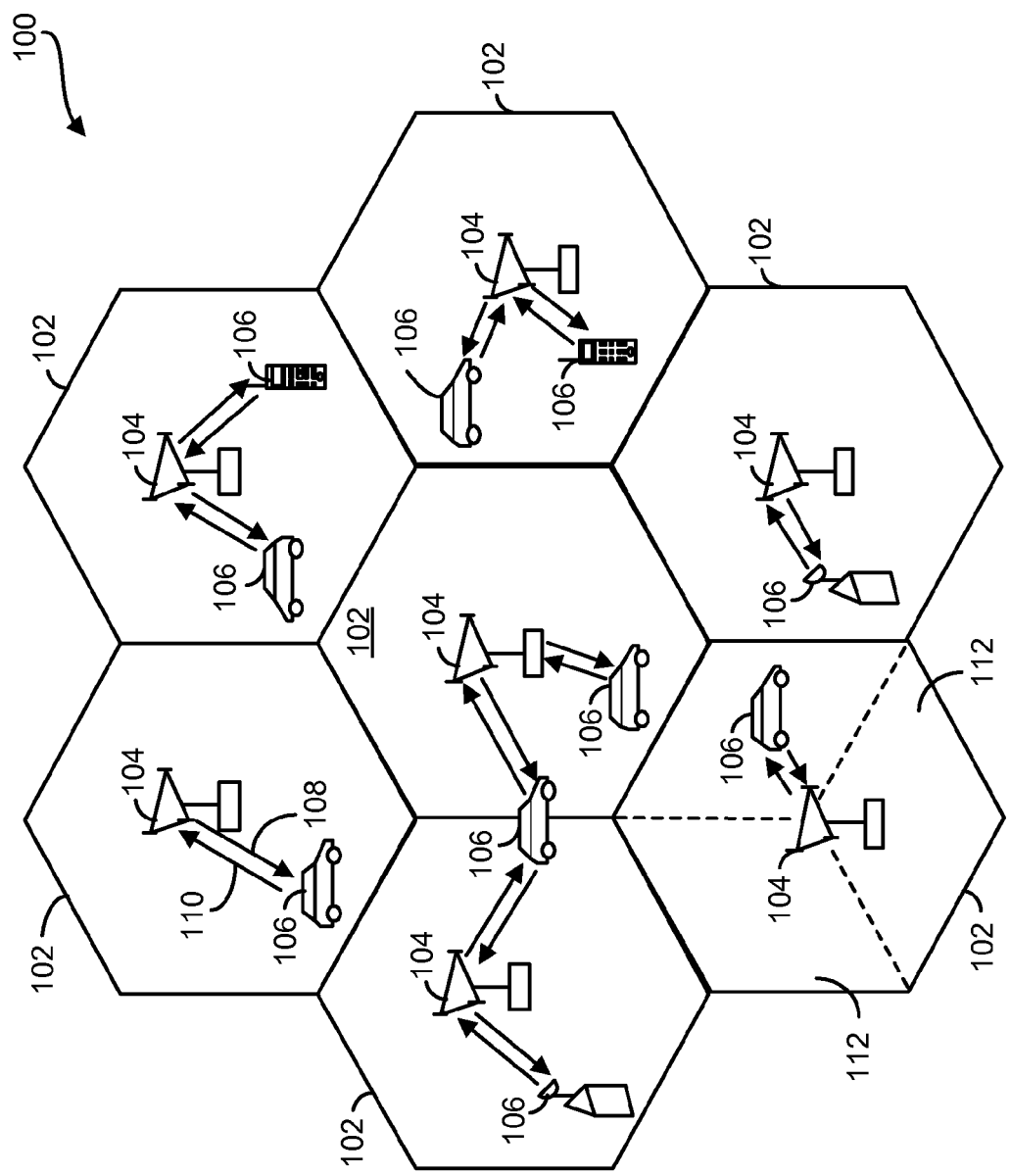
FIG. 1 illustrates an example of a wireless communication system.

A method for combining signals coming from multiple diversity sources is disclosed. The method may include performing maximal-ratio combining (MRC) based equalization and combining for receiver antenna diversity. The method may also include performing MRC-based equalization and combining for repetition diversity. The method may also include performing MRC-based equalization and combining for duplication diversity. The MRC-based equalization and combining for receiver antenna diversity, the MRC-based equalization and combining for repetition diversity, and the MRC-based equalization and combining for duplication diversity may each be performed separately.

A wireless device for combining signals coming from multiple diversity sources is also disclosed. The wireless device may include a receiver antenna diversity equalizer and combiner that is configured to perform MRC-based equalization and combining for receiver antenna diversity. The wireless device may also include a repetition diversity equalizer and combiner that is configured to perform MRC-based equalization and combining for repetition diversity. The wireless device may also include a duplication diversity equalizer and combiner that is configured to perform MRC-based equalization and combining for duplication diversity. The MRC-based equalization and combining for receiver antenna diversity, the MRC-based equalization and combining for repetition diversity, and the MRC-based equalization and combining for duplication diversity may each be performed separately.

An apparatus for combining signals coming from multiple diversity sources is also disclosed. The apparatus may include means for performing MRC-based equalization and combining for receiver antenna diversity. The apparatus may also include means for performing MRC-based equalization and combining for repetition diversity. The apparatus may also include means for performing MRC-based equalization and combining for duplication diversity. The MRC-based equalization and combining for receiver antenna diversity, the MRC-based equalization and combining for repetition diversity, and the MRC-based equalization and combining for duplication diversity may each be performed separately.

A computer-program product for combining signals coming from multiple diversity sources is also disclosed. The computer-program product may include a computer-readable medium having instructions thereon. The instructions may include code for performing MRC-based equalization and combining for receiver antenna diversity. The instructions may also include code for performing MRC-based equalization and combining for repetition diversity. The instructions may also include code for performing MRC-based equalization and combining for duplication diversity. The MRC-based equalization and combining for receiver antenna diversity, the MRC-based equalization and combining for repetition diversity, and the MRC-based equalization and combining for duplication diversity may each be performed separately.

DETAILED DESCRIPTION

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique in which users are assigned sub-carriers in different time slots. OFDMA is a flexible multiple-access technique that can accommodate many users with widely varying applications, data rates, and quality of service requirements.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDMA techniques. If this is the case, the wireless communication system 100 may be referred to as an OFDMA system 100.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within an OFDMA system 100 may utilize antennas that concentrate the flow of power within a particular sector 112 of the cell 102. Such antennas may be referred to as directional antennas.

In wireless communication systems 100, system performance is limited by multipath fading. The use of diversity schemes may mitigate the effects of multipath fading and therefore improve the error performance, data rate, and/or capacity of wireless communication systems.

Several different types of diversity schemes may be utilized in a wireless communication system 100. Some examples of diversity schemes include receiver antenna diversity, repetition diversity and duplication diversity.

To implement receiver antenna diversity, multiple antennas may be provided at the receiver. The signals from these antennas may be combined based on a maximal-ratio combining (MRC) scheme.

Repetition diversity may be implemented by sending the same signal multiple times. The signal may be repeated in the same symbol with different frequency bands, or the signal may be repeated in a different symbol.

To implement repetition diversity, a repetition factor may be defined. In an IEEE 802.16 system, the repetition factor may be 1, 2, 4, or 6. The repetition factor may indicate how many times the signal is repeated. For example, if the repetition factor is equal to two, then the original signal and one additional signal that is the same as the original signal may be transmitted.

Duplication diversity may be implemented by sending same information bits multiple times. For example, the IEEE 802.16e standards support duplicated transmission for the frame control header (FCH) channel. The contents of the FCH channel are called the downlink frame prefix (DLFP). The DLFP is a data structure that is transmitted at the beginning of each frame. The DLFP contains information regarding the current frame and is mapped to the FCH. In an OFDMA system that is configured in accordance with IEEE 802.16e, a 24-bit DLFP message may be duplicated to form a 48-bit block that includes the 24-bit DLFP message and a duplicate of the 24-bit DLFP message.

Figure 2:
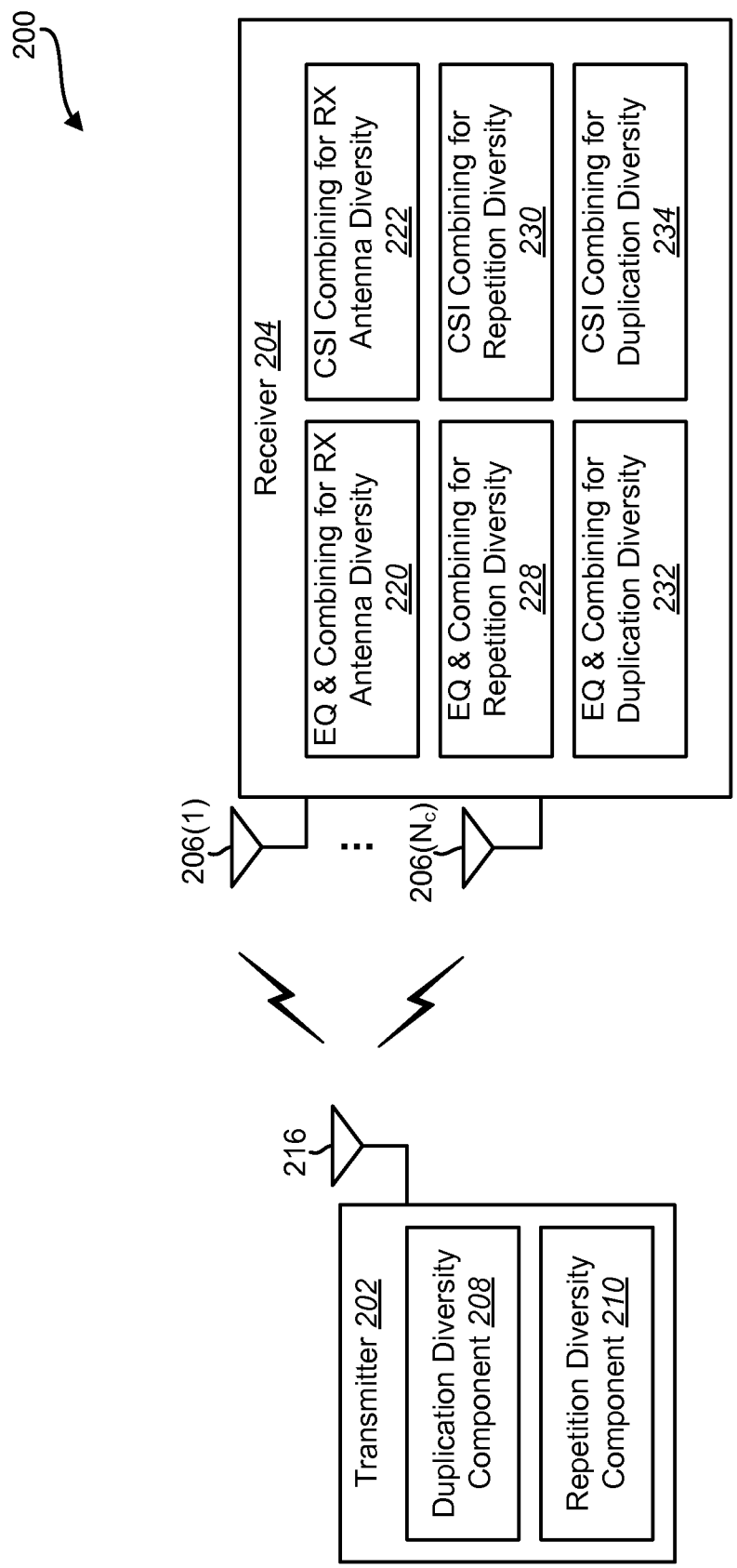
FIG. 2 illustrates an example of a system for combining signals coming from multiple diversity sources.

FIG. 2 illustrates an example of a system 200 for combining signals coming from multiple diversity sources. The system 200 may be configured to utilize OFDMA. For example, the system 200 may be configured in accordance with IEEE 802.16e.

The system 200 includes a transmitter 202. The transmitter 202 includes a component 208 that implements duplication diversity. The transmitter 202 also includes a component 210 that implements repetition diversity. The transmitter 202 also includes an antenna 216.

The system 200 also includes a receiver 204. The receiver 204 includes $N_c$ antennas 206. A first antenna 206(1) and an $N_c^{th}$ antenna 206($N_c$) are shown in FIG. 2. The antennas 206(1) . . . 206($N_c$) may be provided for the purpose of achieving receiver antenna diversity.

The receiver 204 also includes a component 220 that implements equalization and combining for receiver antenna diversity. The receiver also includes a component 222 that implements channel status information (CSI) combining for receiver antenna diversity.

The receiver 204 also includes a component 228 that implements equalization and combining for repetition diversity. The receiver also includes a component 230 that implements CSI combining for repetition diversity.

The receiver 204 also includes a component 232 that implements equalization and combining for duplication diversity. The receiver also includes a component 234 that implements CSI combining for duplication diversity.

The receiver 204 may be configured so that the MRC-based equalization and combining for receiver antenna diversity, the MRC-based equalization and combining for repetition diversity and the MRC-based equalization and combining for duplication diversity are each performed separately. In other words, these equalization and combining operations may be performed sequentially, as opposed to being performed concurrently. Similarly, the MRC-based CSI combining for receiver antenna diversity, the MRC-based CSI combining for repetition diversity and the MRC-based CSI combining for duplication diversity may also each be performed separately.

Figure 3:
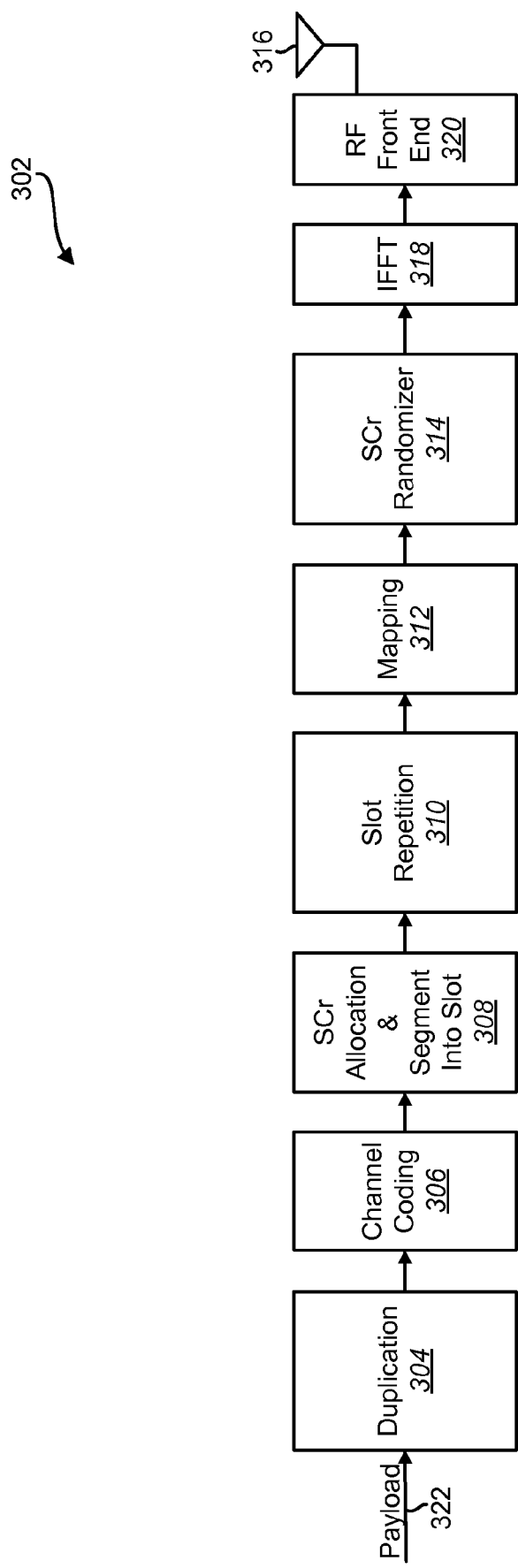
FIG. 3 illustrates an example of a transmitter that is configured to utilize multiple diversity schemes.

FIG. 3 illustrates an example of a transmitter 302 that may be utilized within a wireless communication system 100, such as an OFDMA system that is configured in accordance with IEEE 802.16e. The transmitter 302 may be implemented in a base station 104 for transmitting data to a user terminal 106 on a downlink 108. The transmitter 302 may also be implemented in a user terminal 106 for transmitting data to a base station 104 on an uplink 110.

A payload 322 is shown being provided as input to the transmitter 302. The transmitter 302 includes a component 304 that implements duplication diversity. The transmitter 302 also includes a channel coding component 306, and a component 308 that implements sub-carrier allocation and segmenting into slots. The transmitter 302 also includes a component 310 that implements repetition diversity. The transmitter 302 also includes a mapping component 312, a sub-carrier randomizer 314, an inverse fast Fourier transform (IFFT) component 318, an RF front end 320, and an antenna 316.

Figure 4A:
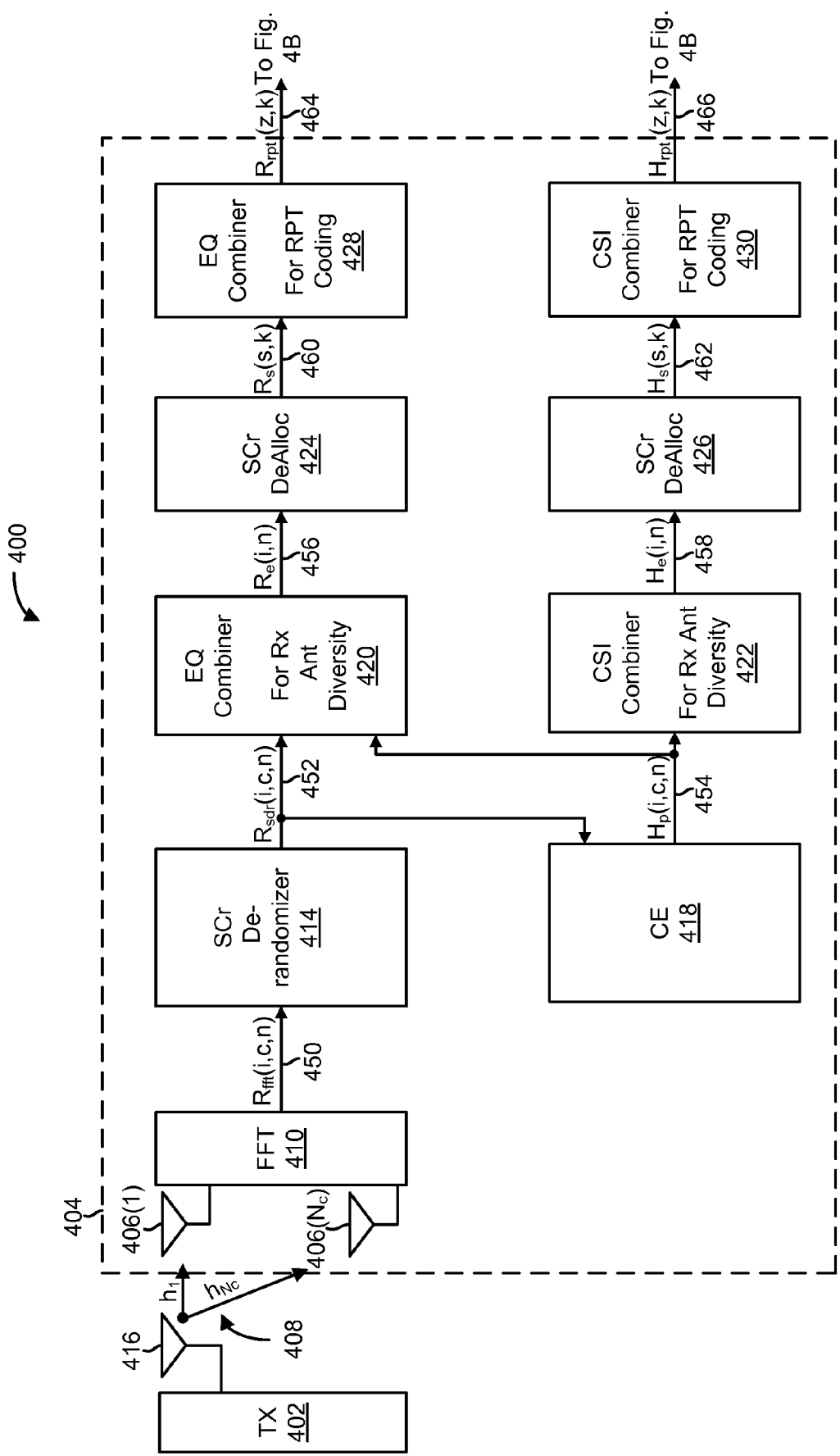
FIGS. 4A and 4B illustrate another example of a system for combining signals coming from multiple diversity sources.
Figure 4B:
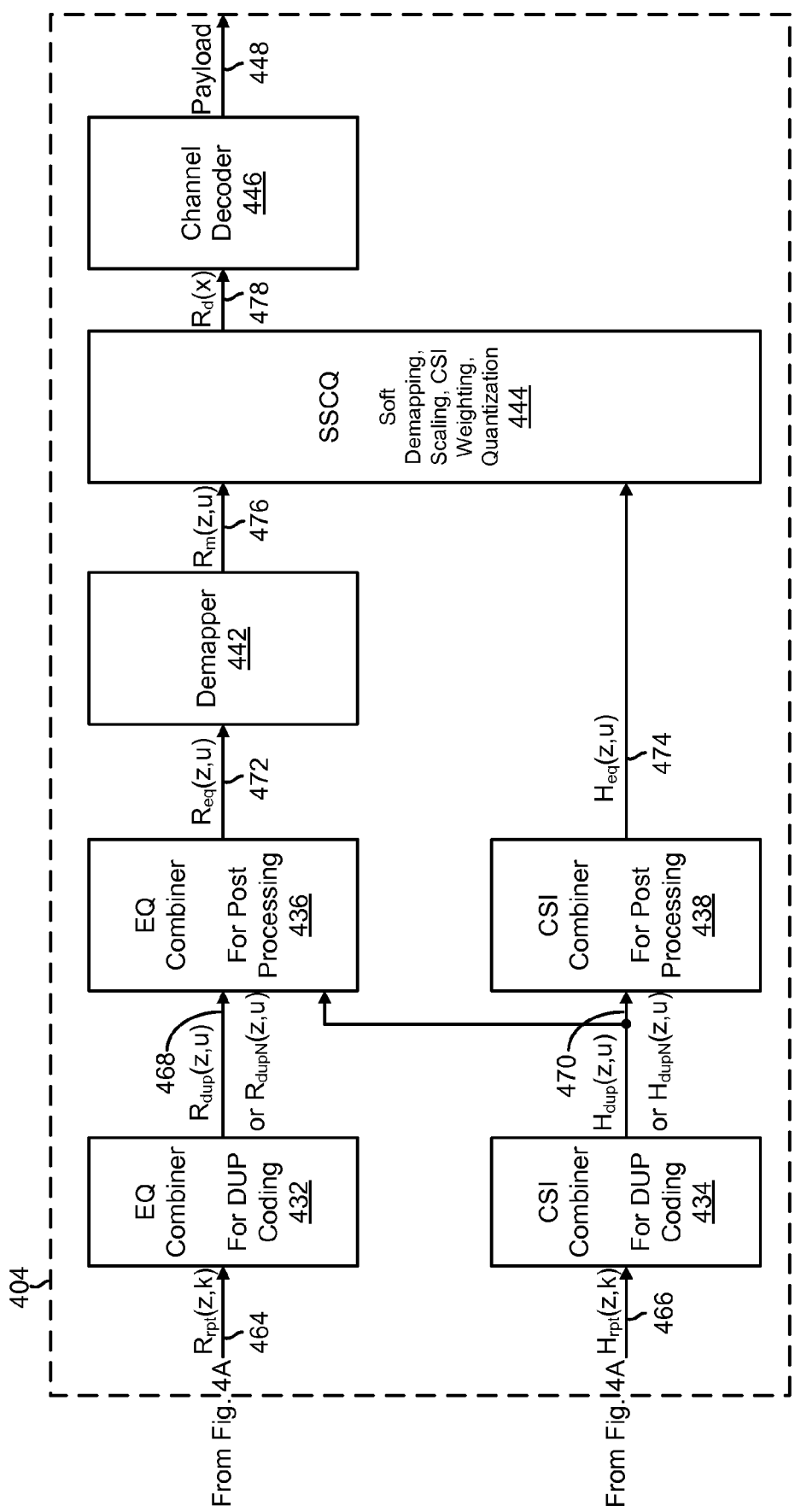

FIGS. 4A and 4B illustrate another example of a system 400 for combining signals coming from multiple diversity sources. The system 400 may be configured to utilize OFDMA. For example, the system 400 may be configured in accordance with IEEE 802.16e.

The system 400 includes a transmitter 402. The transmitter 402 may be configured similarly to the transmitter 302 that is shown in FIG. 3. The transmitter 402 includes an antenna 416.

The system 400 also includes a receiver 404. The receiver 404 may be implemented in a user terminal 106 for receiving data from a base station 104 on a downlink 108. The receiver 404 may also be implemented in a base station 104 for receiving data from a user terminal 106 on an uplink 110.

Some aspects of the receiver 404 are shown in FIG. 4A, and some aspects of the receiver 404 are shown in FIG. 4B. Referring initially to FIG. 4A, the receiver 404 includes $N_c$ antennas 406. A first antenna 406(1) and an $N_c^{th}$ antenna 406($N_c$) are shown in FIG. 4A. The antennas 406(1) ... 406($N_c$) may be provided for the purpose of achieving receiver antenna diversity. There may be $N_c$ different communication channels $h_1 \ldots h_{Nc}$ between the antenna 416 of the transmitter 402 and the antennas 406(1) ... 406($N_c$) of the receiver 404.

The receiver 404 includes a fast Fourier transform (FFT) component 410 that is configured to perform FFT operations with respect to the signals that are received by the antennas 406(1) ... 406($N_c$). An $N_{\mathit{fft}}$-point FFT operation may be performed with respect to each OFDMA symbol within each signal corresponding to a different communication channel h 408. The result of the FFT operations may be expressed as a multi-dimensional array $R_{\mathit{fft}}(i,c,n)$ 450, where the term i is an index for the OFDMA symbol (i=1, 2, ..., $N_t$), the term c is an index for the communication channel 408 (c=1, 2, ..., $N_c$), and the term n is an index for the FFT (n=1, 2, ..., $N_{\mathit{fft}}$).

The receiver 404 also includes a sub-carrier de-randomizer 414 that is configured to perform sub-carrier de-randomization with respect to $R_{\mathit{fft}}(i,c,n)$ 450. Sub-carrier de-randomization may be performed for all useful sub-carriers, on a symbol-by-symbol basis. The result of the sub-carrier de-randomization may be expressed as a multi-dimensional array $R_{sdr}(i,c,n)$ 452.

The receiver 404 also includes a channel estimator 418 that is configured to perform channel estimation with respect to $R_{sdr}(i,c,n)$ 452. Channel estimation may be performed for all possible channels, sub-carriers and symbols. The result of the channel estimation may be expressed as a multi-dimensional array $H_p(i,c,n)$ 454.

The receiver 404 also includes a component 420 that is configured to perform MRC-based equalization and combining for receiver antenna diversity. This component 420 is labeled "EQ Combiner For Rx Ant Diversity" in FIG. 4A, and may be referred to as a receiver antenna diversity equalizer and combiner 420.

The MRC-based equalization and combining for receiver antenna diversity may be performed in accordance with the following equation:

$$R_e(i,n) = \frac{R_{eN}(i,n)}{R_{eD}(i,n)} = \frac{\sum_{c=1}^{N_c} R_{sdr}(i,c,n) H_p(i,c,n)^*}{\sum_{c=1}^{N_c} |H_p(i,c,n)|^2} \quad (1)$$

In this equation, the term $R_e(i,n)$ 456 refers to the result of the MRC-based equalization and combining for receiver antenna diversity. The term $R_{eN}(i,n)$ refers to the numerator of $R_e(i,n)$ 456. The term $R_{eD}(i,n)$ refers to the denominator of $R_e(i,n)$ 456. The expression ( )* refers to the complex conjugate of ( ).

The receiver 404 also includes a component 422 that is configured to perform MRC-based channel status information (CSI) combining for receiver antenna diversity. This component 422 is labeled "CSI Combiner For Rx Ant Diversity" in FIG. 4A, and may be referred to as a receiver antenna diversity CSI combiner 422.

The MRC-based CSI combining for receiver antenna diversity may be performed in accordance with the following equation:

$$H_e(i,n) = \frac{H_{eN}(i,n)}{H_{eD}(i,n)} = \frac{\sum_{c=1}^{N_c} |H_p(i,c,n)|^2}{N_c} \quad (2)$$

In this equation, the term $H_e(i,n)$ 458 refers to the result of the MRC-based CSI combining. The term $H_{eN}(i,n)$ refers to the numerator of $H_e(i,n)$. The term $H_{eD}(i,n)$ refers to the denominator of $H_e(i,n)$.

The receiver 404 also includes a first sub-carrier de-allocator 424 that is configured to perform sub-carrier de-allocation with respect to $R_e(i,n)$ 456. The result of this sub-carrier de-allocation may be expressed as $R_s(s,k)$ 460, where s is an index of the number of allocated slots (s=1, 2, ..., $N_s$), and k is an index of the number of sub-carriers per slot (k=1, 2, ..., $N_{sc}$). The receiver 404 also includes a second sub-carrier de-allocator 426 that is configured to perform sub-carrier de-allocation with respect to $H_e(i,n)$ 458. The result of this sub-carrier de-allocation may be expressed as $H_s(s,k)$ 462. Sub-carrier de-allocation may involve extracting the corresponding sub-carriers and arranging the sub-carriers into the slot basis format.

The receiver 404 also includes a component 428 that is configured to perform MRC-based equalization and combining for repetition diversity. This component 428 is labeled "EQ Combiner For RPT Coding" in FIG. 4A, and may be referred to as a repetition diversity equalizer and combiner 428.

The MRC-based equalization and combining for repetition diversity may be performed in accordance with the following equations:

$$R_{rpt}(z, k) = \frac{R_{rptN}(z, k)}{R_{rptD}(z, k)} \quad (3)$$

$$R_{rptN}(z, k) = \sum_{s=(z-1)R+1}^{(z-1)R+R} R_{sN}(s, k) \quad (4)$$

$$R_{rptD}(z, k) = \sum_{s=(z-1)R+1}^{(z-1)R+R} R_{sD}(s, k) \quad (5)$$

In these equations, the term $R_{rpt}(z,k)$ 464 refers to the result of the MRC-based equalization and combining for repetition diversity. The term $R_{rptN}(z,k)$ is the numerator of $R_{rpt}(z,k)$ 464. The term $R_{rptD}(z,k)$ is the denominator of $R_{rpt}(z,k)$ 464. The term z is an index of the number of allocated slots relative to allocated slot index s, where z=1, 2, ..., $N_z$, where $$N_z = \frac{N_s}{R},$$

and where R is a repetition factor and R=[1, 2, 4, or 6].

The receiver 404 also includes a component 430 that is configured to perform MRC-based CSI combining for repetition diversity. This component 430 is labeled "CSI Combiner For RPT Coding" in FIG. 4A, and may be referred to as a repetition diversity CSI combiner 430.

The MRC-based CSI combining for repetition diversity may be performed in accordance with the following equations:

$$H_{rpt}(z, k) = \frac{H_{rptN}(z, k)}{H_{rptD}(z, k)} \quad (6)$$

$$H_{rptN}(z, k) = \sum_{s=(z-1)R+1}^{(z-1)R+R} H_{sN}(s, k) \quad (7)$$

$$H_{rptD}(z, k) = \sum_{s=(z-1)R+1}^{(z-1)R+R} H_{sD}(s, k) = N_c \times R \quad (8)$$

In these equations, the term $H_{rpt}(z,k)$ 466 refers to the result of the MRC-based CSI combining for repetition diversity. The term $H_{rptN}(z,k)$ is the numerator of $H_{rpt}(z,k)$ 466. The term $H_{rptD}(z,k)$ is the denominator of $H_{rpt}(z,k)$ 466.

Referring now to FIG. 4B, the receiver 404 also includes a component 432 that is configured to perform MRC-based equalization and combining for duplication diversity. This component 432 is labeled "EQ Combiner For DUP Coding" in FIG. 4B, and may be referred to as a duplication diversity equalizer and combiner 432.

The MRC-based equalization and combining for duplication diversity may be performed in accordance with the following equations:

$$R_{dup}(z, u) = \frac{R_{dupN}(z, u)}{R_{dupD}(z, u)} \quad (9)$$

$$R_{dupN}(z, u) = \sum_{d=1}^{D} R_{rptN}(z, k), k = (d-1)N_u + u \quad (10)$$

$$R_{dupD}(z, u) = \sum_{d=1}^{D} R_{rptD}(z, k), k = (d-1)N_u + u \quad (11)$$

In these equations, the term $R_{dup}(z,u)$ 468 refers to the result of the MRC-based equalization and combining for duplication diversity. The term $R_{dupN}(z,u)$ is the numerator of $R_{dup}(z,u)$ 468. The term $R_{dupD}(z,u)$ is the denominator of $R_{dup}(z,u)$ 468. The term u is an index of the number of sub-carriers per duplication, where u=1, 2, ..., $N_u$, where $$N_u = \frac{N_{sc}}{D},$$

and where D is a duplication factor and D=[1 or 2].

The receiver 404 also includes a component 434 that is configured to perform MRC-based CSI combining for duplication diversity. This component 434 is labeled "CSI Combiner For DUP Coding" in FIG. 4B, and may be referred to as a duplication diversity CSI combiner 434.

The MRC-based CSI combining for duplication diversity may be performed in accordance with the following equations:

$$H_{dup}(z, u) = \frac{H_{dupN}(z, u)}{H_{dupD}(z, u)} \quad (12)$$

$$H_{dupN}(z, u) = \sum_{d=1}^{D} H_{rptN}(z, k), k = (d-1)N_u + u \quad (13)$$

$$H_{dupD}(z, u) = \sum_{d=1}^{D} H_{rptD}(z, k) = N_c \times R \times D, k = (d-1)N_u + u \quad (14)$$

In these equations, the term $H_{dup}(z,u)$ 470 refers to the result of the MRC-based CSI combining for duplication diversity. The term $H_{dupN}(z,u)$ is the numerator of $H_{dup}(z,u)$ 470. The term $H_{dupD}(z,u)$ is the denominator of $H_{dup}(z,u)$ 470.

The receiver 404 also includes a component 436 that is configured to perform MRC-based equalization and combining for post processing. This component 436 is labeled "EQ Combiner For Post Processing" in FIG. 4B, and may be referred to as a post processing equalizer and combiner 436.

The MRC-based equalization and combining for post processing may be performed in accordance with the following equation:

$$R_{eq}(z, u) = R_{dup}(z, u) \quad (15)$$
$$= \frac{R_{dupN}(z, u)}{R_{dupD}(z, u)}$$
$$= \frac{R_{dupN}(z, u)}{H_{dupN}(z, u)}$$

In this equation, the term $R_{eq}(z,u)$ 472 refers to the result of the MRC-based equalization and combining for post processing. $R_{eq}(z,u)$ 472 is the final combined signal.

The receiver 404 also includes a component 438 that is configured to perform CSI combining for post processing. This component 438 is labeled "CSI Combiner For Post Processing" in FIG. 4B, and may be referred to as a post processing CSI combiner 438.

The MRC-based CSI combining for post processing may be performed in accordance with the following equation:

$$H_{eq}(z, u) = H_{dup}(z, u) \quad (16)$$
$$= \frac{H_{dupN}(z, u)}{H_{dupD}(z, u)}$$
$$= \frac{H_{dupN}(z, u)}{N_c \times R \times D}$$

In this equation, the term $H_{eq}(z,u)$ 474 refers to the result of the MRC-based CSI combining for post processing. $H_{eq}(z,u)$ 474 is the final CSI estimate.

The receiver 404 also includes a demapper 442 that is configured to perform demapping with respect to $R_{eq}(z,u)$ 472. The result of the demapping is $R_m(z,u)$ 476.

The receiver 404 also includes a component 444 that is configured to perform soft demapping, scaling, CSI weighting and quantization. This component 444 is labeled "SSCQ" in FIG. 4B, where the acronym SSCQ stands for soft demapping, scaling, CSI weighting and quantization. The soft demapping, scaling, CSI weighting and quantization involves both $R_m(z,u)$ 476 and $H_{eq}(z,u)$ 474. The result of the soft demapping, scaling, CSI weighting and quantization is $R_d(x)$ 478.

The receiver 404 also includes a channel decoder 446 that is configured to perform channel decoding with respect to $R_d(x)$ 478. The result of the channel decoding is the payload 448.

As discussed above, the receiver 404 is configured to perform MRC-based equalization and combining for receiver antenna diversity, MRC-based equalization and combining for repetition diversity and MRC-based equalization and combining for duplication diversity. The receiver 404 is configured so that the MRC-based equalization and combining for receiver antenna diversity, the MRC-based equalization and combining for repetition diversity and the MRC-based equalization and combining for duplication diversity are each performed separately. In other words, these equalization and combining operations are performed sequentially, as opposed to being performed concurrently.

The receiver 404 is configured so that the MRC-based equalization and combining for repetition diversity is performed after the MRC-based equalization and combining for receiver antenna diversity, and then the MRC-based equalization and combining for duplication diversity is performed after the MRC-based equalization and combining for repetition diversity. Alternatively, the equalization and combining operations may be performed in a different order.

As discussed above, the receiver 404 is configured to perform MRC-based CSI combining for receiver antenna diversity, MRC-based CSI combining for repetition diversity and MRC-based CSI combining for duplication diversity. The receiver 404 is configured so that the MRC-based CSI combining for receiver antenna diversity, the MRC-based CSI combining for repetition diversity and the MRC-based CSI combining for duplication diversity are each performed separately. In other words, these CSI combining operations are performed sequentially, as opposed to being performed concurrently.

The receiver 404 is configured so that the MRC-based CSI combining for repetition diversity is performed after the MRC-based CSI combining for receiver antenna diversity, and then the MRC-based CSI combining for duplication diversity is performed after the MRC-based CSI combining for repetition diversity. Alternatively, the CSI combining operations may be performed in a different order.

Figure 5:
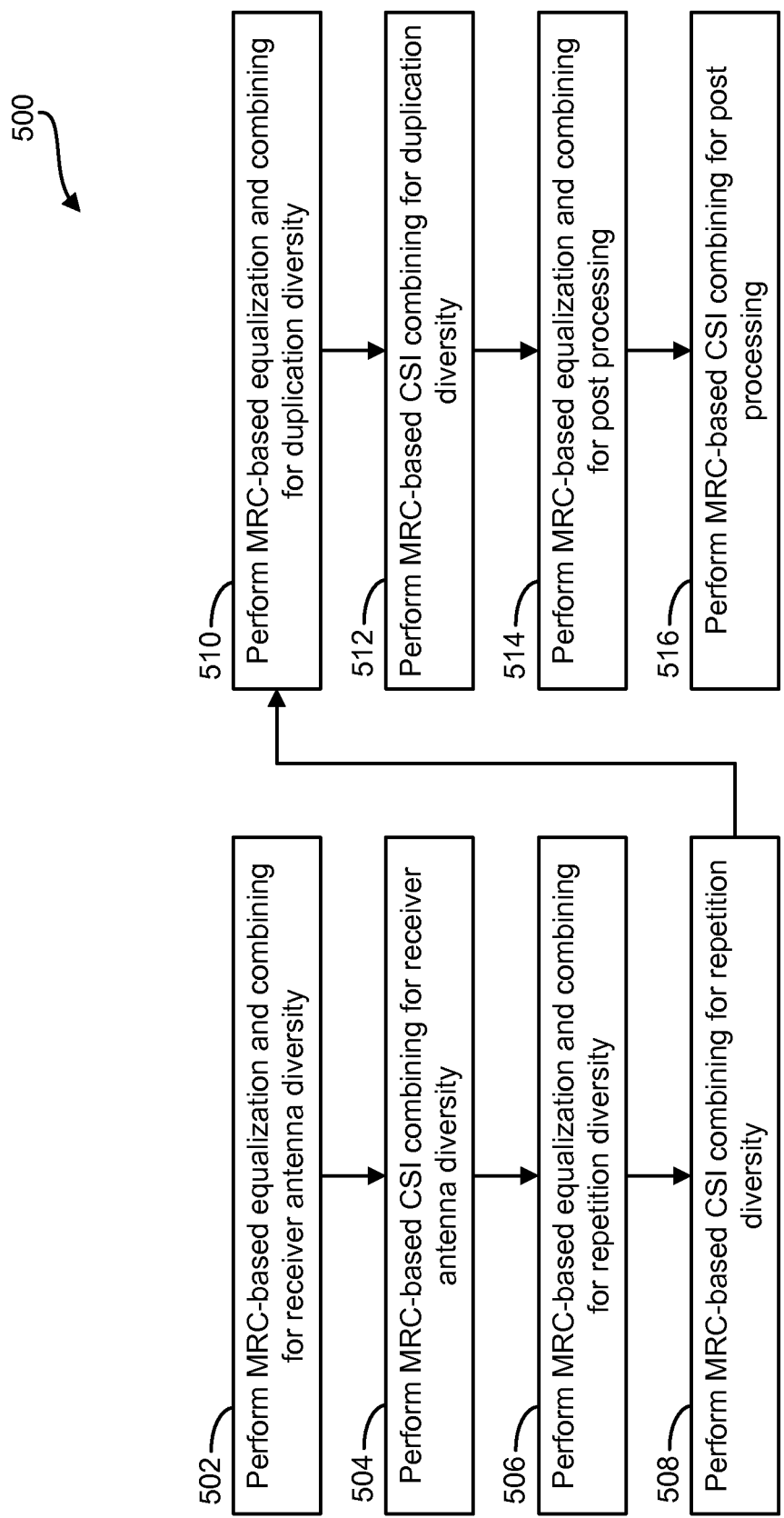
FIG. 5 illustrates a method for combining signals coming from multiple diversity sources.

FIG. 5 illustrates a method 500 for combining signals coming from multiple diversity sources. The method 500 may be implemented by a receiver 404 within a wireless communication system 400.

The method 500 includes performing 502 MRC-based equalization and combining for receiver antenna diversity. This may be done in accordance with equation (1) above. The method 500 also includes performing 504 MRC-based CSI combining for receiver antenna diversity. This may be done in accordance with equation (2) above.

The method 500 also includes performing 506 MRC-based equalization and combining for repetition diversity. This may be done in accordance with equations (3)-(5) above. The method 500 also includes performing 508 MRC-based CSI combining for repetition diversity. This may be done in accordance with equations (6)-(8) above.

The method 500 also includes performing 510 MRC-based equalization and combining for duplication diversity. This may be done in accordance with equations (9)-(11) above. The method 500 also includes performing 512 MRC-based CSI combining for duplication diversity. This may be done in accordance with equations (12)-(14) above.

The method 500 also includes performing 514 MRC-based equalization and combining for post processing. This may be done in accordance with equation (15) above. The method 500 also includes performing 516 MRC-based CSI combining for post processing. This may be done in accordance with equation (16) above.

Figure 6:
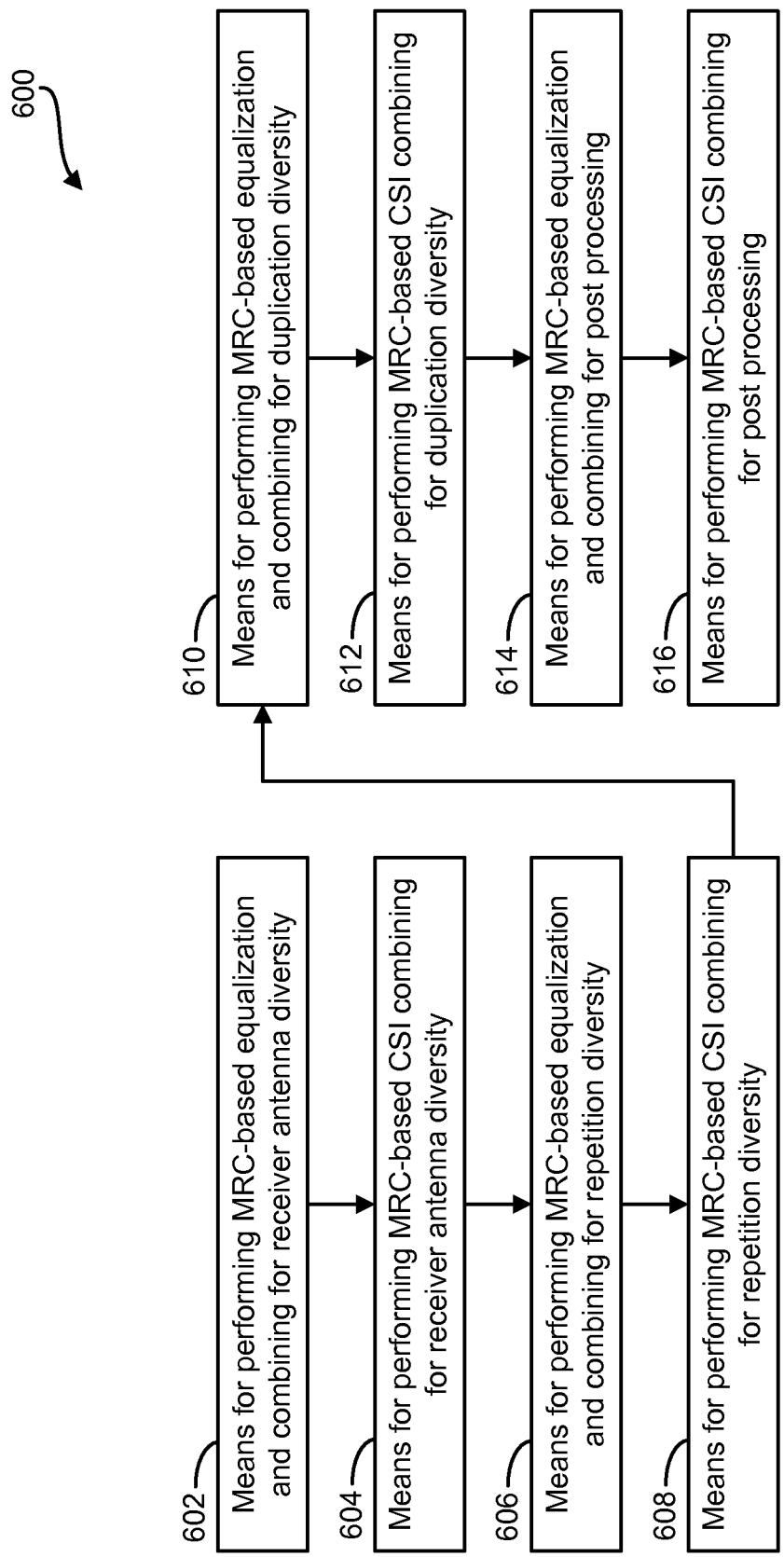
FIG. 6 illustrates means-plus-function blocks corresponding to the method shown in FIG. 5.

The method 500 of FIG. 5 described above may be performed by various hardware and/or software component(s) and/or module(s) corresponding to the means-plus-function blocks 600 illustrated in FIG. 6. In other words, blocks 502 through 516 illustrated in FIG. 5 correspond to means-plus-function blocks 602 through 616 illustrated in FIG. 6.

Figure 7:
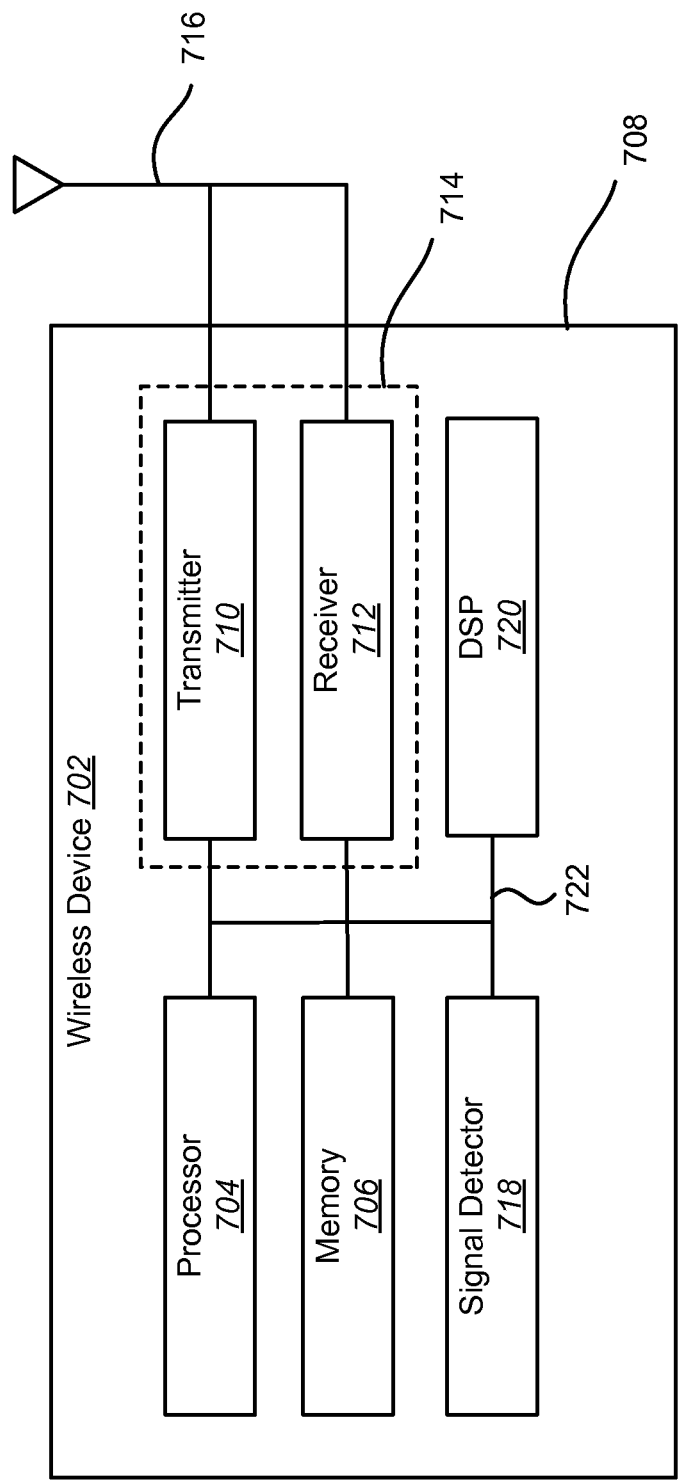
FIG. 7 illustrates various components that may be utilized in a wireless device.

FIG. 7 illustrates various components that may be utilized in a wireless device 702. The wireless device 702 is an example of a device that may be configured to implement the various methods described herein. The wireless device 702 may be a base station 104 or a user terminal 106.

The wireless device 702 may include a processor 704 which controls operation of the wireless device 702. The processor 704 may also be referred to as a central processing unit (CPU). Memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein.

The wireless device 702 may also include a housing 708 that may include a transmitter 710 and a receiver 712 to allow transmission and reception of data between the wireless device 702 and a remote location. The transmitter 710 and receiver 712 may be combined into a transceiver 714. An antenna 716 may be attached to the housing 708 and electrically coupled to the transceiver 714. The wireless device 702 may also include (not shown) multiple transmitters, multiple receivers, multiple transceivers and/or multiple antenna.

The wireless device 702 may also include a signal detector 718 that may be used to detect and quantify the level of signals received by the transceiver 714. The signal detector 718 may detect such signals as total energy, pilot energy per pseudonoise (PN) chips, power spectral density, and other signals.

The wireless device 702 may also include a digital signal processor (DSP) 720 for use in processing signals.

The various components of the wireless device 702 may be coupled together by a bus system 722 which may include a power bus, a control signal bus, and a status signal bus in addition to a data bus. However, for the sake of clarity, the various buses are illustrated in FIG. 7 as the bus system 722.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 5-6, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for combining signals coming from multiple diversity sources, comprising:
    performing maximal-ratio combining (MRC) based equalization and combining for receiver antenna diversity;
    performing MRC-based equalization and combining for repetition diversity; and
    performing MRC-based equalization and combining for duplication diversity;
    wherein the MRC-based equalization and combining for receiver antenna diversity, the MRC-based equalization and combining for repetition diversity, and the MRC-based equalization and combining for duplication diversity are each performed separately;
    wherein the MRC-based equalization and combining for repetition diversity is performed after the MRC-based equalization and combining for receiver antenna diversity; and
    wherein the MRC-based equalization and combining for duplication diversity is performed after the MRC-based equalization and combining for repetition diversity.

2. The method of claim 1, wherein the MRC-based equalization and combining for receiver antenna diversity is performed as $$R_e(i, n) = \frac{\sum_{c=1}^{N_c} R_{sdr}(i, c, n) H_p(i, c, n)^*}{\sum_{c=1}^{N_c} |H_p(i, c, n)|^2},$$

wherein i is an OFDMA symbol index, wherein c is a communication channel index, wherein n is a fast Fourier transform index, wherein $N_c$ indicates the number of receive antennas, wherein $R_{sdr}(\ )$ indicates the result of sub-carrier de-randomization, and wherein $H_p(\ )$ indicates the result of channel estimation.

3. The method of claim 1, wherein the MRC-based equalization and combining for repetition diversity is performed as $$R_{rpt}(z, k) = \frac{R_{rptN}(z, k)}{R_{rptD}(z, k)},$$

wherein $$R_{rptN}(z, k) = \sum_{s=(z-1)R+1}^{(z-1)R+R} R_{sN}(s, k),$$

wherein $$R_{rptD}(z, k) = \sum_{s=(z-1)R+1}^{(z-1)R+R} R_{sD}(s, k),$$

wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

and wherein R is a repetition factor.

4. The method of claim 1, wherein the MRC-based equalization and combining for duplication diversity is performed as $$R_{dup}(z, u) = \frac{R_{dupN}(z, u)}{R_{dupD}(z, u)},$$

wherein $$R_{dupN}(z, u) = \sum_{d=1}^{D} R_{rptN}(z, k),$$

wherein $$R_{dupD}(z, u) = \sum_{d=1}^{D} R_{rptD}(z, k),$$

wherein $R_{rptN}(\ )$ is the numerator of the result of the MRC-based equalization and combining for repetition diversity, wherein $R_{rptD}(\ )$ is the denominator of the result of the MRC-based equalization and combining for repetition diversity, wherein z is an allocated slot index, wherein k is an index of the number of sub-carriers per slot, wherein k=1, 2, ..., $N_{sc}$ and also k=(d−1)$N_u$+u, wherein u is an index of the number of sub-carriers per duplication, wherein $$N_u = \frac{N_{sc}}{D},$$

and wherein D is a duplication factor.

5. The method of claim 1, further comprising performing MRC-based equalization and combining for post processing.

6. The method of claim 5, wherein the MRC-based equalization and combining for post processing is performed as $$R_{eq}(z, u) = \frac{R_{dupN}(z, u)}{H_{dupN}(z, u)},$$

wherein $R_{dupN}(\ )$ is the numerator of the result of the MRC-based equalization and combining for duplication diversity, wherein $H_{dupN}(\ )$ is the numerator of the result of MRC-based CSI combining for duplication diversity, wherein z is an allocated slot index, and wherein u is an index of the number of sub-carriers per duplication.

7. The method of claim 1, further comprising:
performing MRC-based channel status information (CSI) combining for receiver antenna diversity;
performing MRC-based CSI combining for repetition diversity; and
performing MRC-based CSI combining for duplication diversity,
wherein the MRC-based CSI combining for receiver antenna diversity, the MRC-based CSI combining for repetition diversity, and the MRC-based CSI combining for duplication diversity are each performed separately.

8. The method of claim 7, wherein:
the MRC-based CSI combining for repetition diversity is performed after the MRC-based CSI combining for receiver antenna diversity; and
the MRC-based CSI combining for duplication diversity is performed after the MRC-based CSI combining for repetition diversity.

9. The method of claim 7, wherein the MRC-based CSI combining for receiver antenna diversity is performed as $$H_e(i, n) = \frac{\sum_{c=1}^{N_c} |H_p(i, c, n)|^2}{N_c},$$

wherein i is an OFDMA symbol index, wherein c is a communication channel index, wherein n is a fast Fourier transform index, wherein $N_c$ indicates the number of receive antennas, and wherein $H_p(\ )$ indicates the result of channel estimation.

10. The method of claim 7, wherein the MRC-based CSI combining for repetition diversity is performed as $$H_{rpt}(z, k) = \frac{H_{rptN}(z, k)}{H_{rptD}(z, k)},$$

wherein $$H_{rptN}(z, k) = \sum_{s=(z-1)R+1}^{(z-1)R+R} H_{sN}(s, k),$$

wherein $$H_{rptD}(z, k) = \sum_{s=(z-1)R+1}^{(z-1)R+R} H_{sD}(s, k) = N_c \times R,$$

wherein $H_{sN}(\ )$ is the numerator of the result of sub-carrier de-allocation, wherein $H_{sD}(\ )$ is the denominator of the result of sub-carrier de-allocation, wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

wherein R is a repetition factor, and wherein $N_c$ indicates the number of receive antennas.

11. The method of claim 7, wherein the MRC-based CSI combining for duplication diversity is performed as $$H_{dup}(z, u) = \frac{H_{dupN}(z, u)}{H_{dupD}(z, u)},$$

wherein $$H_{dupN}(z, u) = \sum_{d=1}^{D} H_{rptN}(z, k),$$

wherein $$H_{dupD}(z, u) = \sum_{d=1}^{D} H_{rptD}(z, k) = N_c \times R \times D,$$

wherein $H_{rptN}(\ )$ is the numerator of the result of the MRC-based CSI combining for repetition diversity, wherein $H_{rptD}(\ )$ is the denominator of the result of the MRC-based CSI combining for repetition diversity, wherein z is an allocated slot index, wherein k is an index of the number of sub-carriers per slot, wherein k=1, 2, ..., $N_{sc}$ and also k=(d-1)$N_u$+u, wherein u is an index of the number of sub-carriers per duplication, wherein $$N_u = \frac{N_{sc}}{D},$$

wherein D is a duplication factor, and wherein R is a repetition factor.

12. The method of claim 7, further comprising performing MRC-based CSI combining for post processing.

13. The method of claim 12, wherein the MRC-based CSI combining for post processing is performed as $$H_{eq}(z, u) = \frac{H_{dupN}(z, u)}{N_c \times R \times D},$$

wherein $H_{dupN}(\ )$ is the numerator of the result of the MRC-based CSI combining for duplication diversity, wherein z is an allocated slot index, and wherein u is an index of the number of sub-carriers per duplication, wherein $N_c$ is the number of receive antennas, wherein R is a repetition factor, and wherein D is a duplication factor.

14. A wireless device for combining signals coming from multiple diversity sources, comprising:
a receiver antenna diversity equalizer and combiner that is configured to perform maximal-ratio combining (MRC) based equalization and combining for receiver antenna diversity;
a repetition diversity equalizer and combiner that is configured to perform MRC-based equalization and combining for repetition diversity; and
a duplication diversity equalizer and combiner that is configured to perform MRC-based equalization and combining for duplication diversity;
wherein the MRC-based equalization and combining for receiver antenna diversity, the MRC-based equalization and combining for repetition diversity, and the MRC-based equalization and combining for duplication diversity are each performed separately;
wherein the MRC-based equalization and combining for repetition diversity is performed after the MRC-based equalization and combining for receiver antenna diversity; and
wherein the MRC-based equalization and combining for duplication diversity is performed after the MRC-based equalization and combining for repetition diversity.

15. The wireless device of claim 14, wherein the MRC-based equalization and combining for receiver antenna diversity is performed as $$R_e(i, n) = \frac{\sum_{c=1}^{N_c} R_{sdr}(i, c, n) H_p(i, c, n)^*}{\sum_{c=1}^{N_c} |H_p(i, c, n)|^2},$$

wherein i is an OFDMA symbol index, wherein c is a communication channel index, wherein n is a fast Fourier transform index, wherein $N_c$ indicates the number of receive antennas, wherein $R_{sdr}(\ )$ indicates the result of sub-carrier de-randomization, and wherein $H_p(\ )$ indicates the result of channel estimation.

16. The wireless device of claim 14, wherein the MRC-based equalization and combining for repetition diversity is performed as $$R_{rpt}(z, k) = \frac{R_{rptN}(z, k)}{R_{rptD}(z, k)},$$

wherein $$R_{rptN}(z, k) = \sum_{s=(z-1)R+1}^{(z-1)R+R} R_{sN}(s, k),$$

wherein $$R_{rptD}(z, k) = \sum_{s=(z-1)R+1}^{(z-1)R+R} R_{sD}(s, k),$$

wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

and wherein R is a repetition factor.

17. The wireless device of claim 14, wherein the MRC-based equalization and combining for duplication diversity is performed as $$R_{dup}(z, u) = \frac{R_{dupN}(z, u)}{R_{dupD}(z, u)},$$

wherein $$R_{dupN}(z, u) = \sum_{d=1}^{D} R_{rptN}(z, k),$$

wherein $$R_{dupD}(z, u) = \sum_{d=1}^{D} R_{rptD}(z, k),$$

wherein $R_{rptN}(\ )$ is the numerator of the result of the MRC-based equalization and combining for repetition diversity, wherein $R_{rptD}(\ )$ is the denominator of the result of the MRC-based equalization and combining for repetition diversity, wherein z is an allocated slot index, wherein k is an index of the number of sub-carriers per slot, wherein k=1, 2, ..., $N_{sc}$ and also k=(d−1)$N_u$+u, wherein u is an index of the number of sub-carriers per duplication, wherein $$N_u = \frac{N_{sc}}{D},$$

and wherein D is a duplication factor.

18. The wireless device of claim 14, further comprising a post processing equalizer and combiner that is configured to perform MRC-based equalization and combining for post processing.

19. The wireless device of claim 18, wherein the MRC-based equalization and combining for post processing is performed as $$R_{ep}(z, u) = \frac{R_{dupN}(z, u)}{H_{dupN}(z, u)},$$

wherein $R_{dupN}(\ )$ is the numerator of the result of the MRC-based equalization and combining for duplication diversity, wherein $H_{dupN}(\ )$ is the numerator of the result of MRC-based CSI combining for duplication diversity, wherein z is an allocated slot index, and wherein u is an index of the number of sub-carriers per duplication.

20. The wireless device of claim 14, further comprising:
a receiver antenna diversity CSI combiner that is configured to perform MRC-based channel status information (CSI) combining for receiver antenna diversity;
a repetition diversity CSI combiner that is configured to perform MRC-based CSI combining for repetition diversity; and
a duplication diversity CSI combiner that is configured to perform MRC-based CSI combining for duplication diversity,
wherein the MRC-based CSI combining for receiver antenna diversity, the MRC-based CSI combining for repetition diversity, and the MRC-based CSI combining for duplication diversity are each performed separately.

21. The wireless device of claim 20, wherein:
the MRC-based CSI combining for repetition diversity is performed after the MRC-based CSI combining for receiver antenna diversity; and
the MRC-based CSI combining for duplication diversity is performed after the MRC-based CSI combining for repetition diversity.

22. The wireless device of claim 20, wherein the MRC-based CSI combining for receiver antenna diversity is performed as $$H_e(i, n) = \frac{\sum_{c=1}^{N_c} |H_p(i, c, n)|^2}{N_c},$$

wherein i is an OFDMA symbol index, wherein c is a communication channel index, wherein n is a fast Fourier transform index, wherein $N_c$ indicates the number of receive antennas, and wherein $H_p(\ )$ indicates the result of channel estimation.

23. The wireless device of claim 20, wherein the MRC-based CSI combining for repetition diversity is performed as $$H_{rpt}(z, k) = \frac{H_{rptN}(z, k)}{H_{rptD}(z, k)},$$

wherein $$H_{rptN}(z,k) = \sum_{s=(z-1)R+1}^{(z-1)R+R} H_{sN}(s,k),$$

wherein $$H_{rptD}(z,k) = \sum_{s=(z-1)R+1}^{(z-1)R+R} H_{sD}(s,k) = N_c \times R,$$

wherein $H_{sN}(\ )$ is the numerator of the result of sub-carrier de-allocation, wherein $H_{sD}(\ )$ is the denominator of the result of sub-carrier de-allocation, wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

wherein R is a repetition factor, and wherein $N_c$ indicates the number of receive antennas.

24. The wireless device of claim 20, wherein the MRC-based CSI combining for duplication diversity is performed as $$H_{dup}(z,u) = \frac{H_{dupN}(z,u)}{H_{dupD}(z,u)},$$

wherein $$H_{dupN}(z,u) = \sum_{d=1}^{D} H_{rptN}(z,k),$$

wherein $$H_{dupD}(z,u) = \sum_{d=1}^{D} H_{rptD}(z,k) = N_c \times R \times D,$$

wherein $H_{rptN}(\ )$ is the numerator of the result of the MRC-based CSI combining for repetition diversity, wherein $H_{rptD}(\ )$ is the denominator of the result of the MRC-based CSI combining for repetition diversity, wherein z is an allocated slot index, wherein k is an index of the number of sub-carriers per slot, wherein k=1, 2, ..., $N_{sc}$ and also k=(d−1)$N_u$+u, wherein u is an index of the number of sub-carriers per duplication, wherein $$N_u = \frac{N_{sc}}{D},$$

wherein D is a duplication factor, and wherein R is a repetition factor.

25. The wireless device of claim 20, further comprising a post processing CSI combiner that is configured to perform MRC-based CSI combining for post processing.

26. The wireless device of claim 25, wherein the MRC-based CSI combining for post processing is performed as $$H_{eq}(z,u) = \frac{H_{dupN}(z,u)}{N_c \times R \times D},$$

wherein $H_{dupN}(\ )$ is the numerator of the result of the MRC-based CSI combining for duplication diversity, wherein z is an allocated slot index, and wherein u is an index of the number of sub-carriers per duplication, wherein $N_c$ is the number of receive antennas, wherein R is a repetition factor, and wherein D is a duplication factor.

27. An apparatus for combining signals coming from multiple diversity sources, comprising:
    means for performing maximal-ratio combining (MRC) based equalization and combining for receiver antenna diversity;
    means for performing MRC-based equalization and combining for repetition diversity; and
    means for performing MRC-based equalization and combining for duplication diversity;
    wherein the MRC-based equalization and combining for receiver antenna diversity, the MRC-based equalization and combining for repetition diversity, and the MRC-based equalization and combining for duplication diversity are each performed separately;
    wherein the MRC-based equalization and combining for repetition diversity is performed after the MRC-based equalization and combining for receiver antenna diversity; and
    wherein the MRC-based equalization and combining for duplication diversity is performed after the MRC-based equalization and combining for repetition diversity.

28. The apparatus of claim 27, wherein the MRC-based equalization and combining for receiver antenna diversity is performed as $$R_e(i,n) = \frac{\sum_{c=1}^{N_c} R_{sdr}(i,c,n) H_p(i,c,n)^*}{\sum_{c=1}^{N_c} |H_p(i,c,n)|^2},$$

wherein i is an OFDMA symbol index, wherein c is a communication channel index, wherein n is a fast Fourier transform index, wherein $N_c$ indicates the number of receive antennas, wherein $R_{sdr}(\ )$ indicates the result of sub-carrier de-randomization, and wherein $H_p(\ )$ indicates the result of channel estimation.

29. The apparatus of claim 27, wherein the MRC-based equalization and combining for repetition diversity is performed as $$R_{rpt}(z,k) = \frac{R_{rptN}(z,k)}{R_{rptD}(z,k)},$$

wherein $$R_{rptN}(z, k) = \sum_{s=(z-1)R+1}^{(z-1)R+R} R_{sN}(s, k),$$

wherein $$R_{rptD}(z, k) = \sum_{s=(z-1)R+1}^{(z-1)R+R} R_{sD}(s, k),$$

wherein k is an index of the number of sub-carriers per slot, wherein s is an allocated slot index, wherein $s=1, 2, \ldots, N_s$, wherein z is a relative allocated slot index, wherein $z=1, 2, \ldots, N_z$, wherein $$N_z = \frac{N_s}{R},$$

and wherein R is a repetition factor.

30. The apparatus of claim 27, wherein the MRC-based equalization and combining for duplication diversity is performed as $$R_{dup}(z, u) = \frac{R_{dupN}(z, u)}{R_{dupD}(z, u)},$$

wherein $$R_{dupN}(z, u) = \sum_{d=1}^{D} R_{rptN}(z, k),$$

wherein $$R_{dupD}(z, u) = \sum_{d=1}^{D} R_{rptD}(z, k),$$

wherein $R_{rptN}(\ )$ is the numerator of the result of the MRC-based equalization and combining for repetition diversity, wherein $R_{rptD}(\ )$ is the denominator of the result of the MRC-based equalization and combining for repetition diversity, wherein z is an allocated slot index, wherein k is an index of the number of sub-carriers per slot, wherein $k=1, 2, \ldots, N_{sc}$ and also $k=(d-1)N_u+u$, wherein u is an index of the number of sub-carriers per duplication, wherein $$N_u = \frac{N_{sc}}{D},$$

and wherein D is a duplication factor.

31. The apparatus of claim 27, further comprising means for performing MRC-based equalization and combining for post processing.

32. The apparatus of claim 31, wherein the MRC-based equalization and combining for post processing is performed as $$R_{eq}(z, u) = \frac{R_{dupN}(z, u)}{H_{dupN}(z, u)},$$

wherein $R_{dupN}(\ )$ is the numerator of the result of the MRC-based equalization and combining for duplication diversity, wherein $H_{dupN}(\ )$ is the numerator of the result of MRC-based CSI combining for duplication diversity, wherein z is an allocated slot index, and wherein u is an index of the number of sub-carriers per duplication.

33. The apparatus of claim 27, further comprising:
means for performing MRC-based channel status information (CSI) combining for receiver antenna diversity;
means for performing MRC-based CSI combining for repetition diversity; and
means for performing MRC-based CSI combining for duplication diversity,
wherein the MRC-based CSI combining for receiver antenna diversity, the MRC-based CSI combining for repetition diversity, and the MRC-based CSI combining for duplication diversity are each performed separately.

34. The apparatus of claim 33, wherein:
the MRC-based CSI combining for repetition diversity is performed after the MRC-based CSI combining for receiver antenna diversity; and
the MRC-based CSI combining for duplication diversity is performed after the MRC-based CSI combining for repetition diversity.

35. The apparatus of claim 33, wherein the MRC-based CSI combining for receiver antenna diversity is performed as $$H_e(i, n) = \frac{\sum_{c=1}^{N_c} |H_p(i, c, n)|^2}{N_c},$$

wherein i is an OFDMA symbol index, wherein c is a communication channel index, wherein n is a fast Fourier transform index, wherein $N_c$ indicates the number of receive antennas, and wherein $H_p(\ )$ indicates the result of channel estimation.

36. The apparatus of claim 33, wherein the MRC-based CSI combining for repetition diversity is performed as $$H_{rpt}(z, k) = \frac{H_{rptN}(z, k)}{H_{rptD}(z, k)},$$

wherein $$H_{rptN}(z, k) = \sum_{s=(z-1)R+1}^{(z-1)R+R} H_{sN}(s, k),$$

wherein $$H_{rptD}(z, k) = \sum_{s=(z-1)R+1}^{(z-1)R+R} H_{sD}(s, k) = N_c \times R,$$

wherein $H_{sN}(\ )$ is the numerator of the result of sub-carrier de-allocation, wherein $H_{sD}(\ )$ is the denominator of the result of sub-carrier de-allocation, wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

wherein R is a repetition factor, and wherein $N_c$ indicates the number of receive antennas.

37. The apparatus of claim 33, wherein the MRC-based CSI combining for duplication diversity is performed as $$H_{dup}(z, u) = \frac{H_{dupN}(z, u)}{H_{dupD}(z, u)},$$

wherein $$H_{dupN}(z, u) = \sum_{d=1}^{D} H_{rptN}(z, k),$$

wherein $$H_{dupD}(z, u) = \sum_{d=1}^{D} H_{rptD}(z, k) = N_c \times R \times D,$$

wherein $H_{rptN}(\ )$ is the numerator of the result of the MRC-based CSI combining for repetition diversity, wherein $H_{rptD}(\ )$ is the denominator of the result of the MRC-based CSI combining for repetition diversity, wherein z is an allocated slot index, wherein k is an index of the number of sub-carriers per slot, wherein k=1, 2, ..., $N_{sc}$ and also k=(d−1)$N_u$+u, wherein u is an index of the number of sub-carriers per duplication, wherein $$N_u = \frac{N_{sc}}{D},$$

wherein D is a duplication factor, and wherein R is a repetition factor.

38. The apparatus of claim 33, further comprising means for performing MRC-based CSI combining for post processing.

39. The apparatus of claim 38, wherein the MRC-based CSI combining for post processing is performed as $$H_{eq}(z, u) = \frac{H_{dupN}(z, u)}{N_c \times R \times D},$$

wherein $H_{dupN}(\ )$ is the numerator of the result of the MRC-based CSI combining for duplication diversity, wherein z is an allocated slot index, and wherein u is an index of the number of sub-carriers per duplication, wherein $N_c$ is the number of receive antennas, wherein R is a repetition factor, and wherein D is a duplication factor.

40. A computer-program product for combining signals coming from multiple diversity sources, the computer-program product comprising a non-transitory computer-readable medium having instructions thereon, the instructions being executable to:
 perform maximal-ratio combining (MRC) based equalization and combining for receiver antenna diversity;
 perform MRC-based equalization and combining for repetition diversity; and
 perform MRC-based equalization and combining for duplication diversity;
 wherein the MRC-based equalization and combining for receiver antenna diversity, the MRC-based equalization and combining for repetition diversity, and the MRC-based equalization and combining for duplication diversity are each performed separately;
 wherein the MRC-based equalization and combining for repetition diversity is performed after the MRC-based equalization and combining for receiver antenna diversity; and
 wherein the MRC-based equalization and combining for duplication diversity is performed after the MRC-based equalization and combining for repetition diversity.

41. The computer-program product of claim 40, wherein the MRC-based equalization and combining for receiver antenna diversity is performed as $$R_e(i, n) = \frac{\sum_{c=1}^{N_c} R_{sdr}(i, c, n) H_p(i, c, n)^*}{\sum_{c=1}^{N_c} |H_p(i, c, n)|^2},$$

wherein i is an OFDMA symbol index, wherein c is a communication channel index, wherein n is a fast Fourier transform index, wherein $N_c$ indicates the number of receive antennas, wherein $R_{sdr}(\ )$ indicates the result of sub-carrier de-randomization, and wherein $H_p(\ )$ indicates the result of channel estimation.

42. The computer-program product of claim 40, wherein the MRC-based equalization and combining for repetition diversity is performed as $$R_{rpt}(z, k) = \frac{R_{rptN}(z, k)}{R_{rptD}(z, k)},$$

wherein $$R_{rptN}(z, k) = \sum_{s=(z-1)R+1}^{(z-1)R+R} R_{sN}(s, k),$$

wherein $$R_{rptD}(z, k) = \sum_{s=(z-1)R+1}^{(z-1)R+R} R_{sD}(s, k),$$

wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

and wherein R is a repetition factor.

43. The computer-program product of claim 40, wherein the MRC-based equalization and combining for duplication diversity is performed as $$R_{dup}(z, u) = \frac{R_{dupN}(z, u)}{R_{dupD}(z, u)},$$

wherein $$R_{dupN}(z, u) = \sum_{d=1}^{D} R_{rptN}(z, k),$$

wherein $$R_{dupN}(z, u) = \sum_{d=1}^{D} R_{rptN}(z, k),$$

wherein $R_{rptN}(\ )$ is the numerator of the result of the MRC-based equalization and combining for repetition diversity, wherein $R_{rptD}(\ )$ is the denominator of the result of the MRC-based equalization and combining for repetition diversity, wherein z is an allocated slot index, wherein k is an index of the number of sub-carriers per slot, wherein k=1, 2, ..., $N_{sc}$ and also k=(d−1)$N_u$+u , wherein u is an index of the number of sub-carriers per duplication, wherein $$N_u = \frac{N_{sc}}{D},$$

and wherein D is a duplication factor.

44. The computer-program product of claim 40, wherein the instructions are also executable to perform MRC-based equalization and combining for post processing.

45. The computer-program product of claim 44, wherein the MRC-based equalization and combining for post processing is performed as $$R_{eq}(z, u) = \frac{R_{dupN}(z, u)}{H_{dupN}(z, u)},$$

wherein $R_{dupN}(\ )$ is the numerator of the result of the MRC-based equalization and combining for duplication diversity, wherein $H_{dupN}(\ )$ is the numerator of the result of MRC-based CSI combining for duplication diversity, wherein z is an allocated slot index, and wherein u is an index of the number of sub-carriers per duplication.

46. The computer-program product of claim 40, wherein the instructions are also executable to:
perform MRC-based channel status information (CSI) combining for receiver antenna diversity;
perform MRC-based CSI combining for repetition diversity; and
perform MRC-based CSI combining for duplication diversity,
wherein the MRC-based CSI combining for receiver antenna diversity, the MRC-based CSI combining for repetition diversity, and the MRC-based CSI combining for duplication diversity are each performed separately.

47. The computer-program product of claim 46, wherein:
the MRC-based CSI combining for repetition diversity is performed after the MRC-based CSI combining for receiver antenna diversity; and
the MRC-based CSI combining for duplication diversity is performed after the MRC-based CSI combining for repetition diversity.

48. The computer-program product of claim 46, wherein the MRC-based CSI combining for receiver antenna diversity is performed as $$H_e(i, n) = \frac{\sum_{c=1}^{N_c} |H_p(i, c, n)|^2}{N_c},$$

wherein i is an OFDMA symbol index, wherein c is a communication channel index, wherein n is a fast Fourier transform index, wherein $N_c$ indicates the number of receive antennas, and wherein $H_p(\ )$ indicates the result of channel estimation.

49. The computer-program product of claim 46, wherein the MRC-based CSI combining for repetition diversity is performed as $$H_{rpt}(z, k) = \frac{H_{rptN}(z, k)}{H_{rptD}(z, k)},$$

wherein $$H_{rptN}(z, k) = \sum_{s=(z-1)R+1}^{(z-1)R+R} H_{sN}(s, k),$$

wherein $$H_{rptD}(z, k) = \sum_{s=(z-1)R+1}^{(z-1)R+R} H_{sD}(s, k) = N_c \times R,$$

wherein $H_{sN}(\ )$ is the numerator of the result of sub-carrier de-allocation, wherein $H_{sD}(\ )$ is the denominator of the result of sub-carrier de-allocation, wherein k is an index of the number of sub-carriers per slot, wherein s is an allocated slot index, wherein s=1, 2, ..., $N_s$, wherein z is a relative allocated slot index, wherein z=1, 2, ..., $N_z$, wherein $$N_z = \frac{N_s}{R},$$

wherein R is a repetition factor, and wherein $N_c$ indicates the number of receive antennas.

50. The computer-program product of claim 46, wherein the MRC-based CSI combining for duplication diversity is performed as $$H_{dup}(z, u) = \frac{H_{dupN}(z, u)}{H_{dupD}(z, u)},$$

wherein $$H_{dupN}(z, u) = \sum_{d=1}^{D} H_{rptN}(z, k),$$

wherein $$H_{dupD}(z, u) = \sum_{d=1}^{D} H_{rptD}(z, k) = N_c \times R \times D,$$

wherein $H_{rptN}(\ )$ is the numerator of the result of the MRC-based CSI combining for repetition diversity, wherein $H_{rptD}(\ )$ is the denominator of the result of the MRC-based CSI combining for repetition diversity, wherein z is an allocated slot index, wherein k is an index of the number of sub-carriers per slot, wherein k=1, 2, . . . , $N_{sc}$ and also k=(d−1)$N_u$+u , wherein u is an index of the number of sub-carriers per duplication, wherein $$N_u = \frac{N_{sc}}{D},$$

wherein D is a duplication factor, and wherein R is a repetition factor.

51. The computer-program product of claim 46, wherein the instructions are also executable to perform MRC-based CSI combining for post processing.

52. The computer-program product of claim 51, wherein the MRC-based CSI combining for post processing is performed as $$H_{eq}(z, u) = \frac{H_{dupN}(z, u)}{N_c \times R \times D},$$

wherein $H_{dupN}(\ )$ is the numerator of the result of the MRC-based CSI combining for duplication diversity, wherein z is an allocated slot index, and wherein u is an index of the number of sub-carriers per duplication, wherein $N_c$ is the number of receive antennas, wherein R is a repetition factor, and wherein D is a duplication factor.

* * * * *